US010326694B2

(12) United States Patent
Moreno et al.

(10) Patent No.: US 10,326,694 B2
(45) Date of Patent: Jun. 18, 2019

(54) ASYMMETRIC MULTI-DESTINATION TRAFFIC REPLICATION IN OVERLAY NETWORKS

(71) Applicant: Cisco Technology, Inc., San Jose, CA (US)

(72) Inventors: Victor Moreno, San Jose, CA (US); Shyam Kapadia, San Jose, CA (US); Murali Venkateshaiah, San Jose, CA (US); John Lo, San Jose, CA (US); Liqin Dong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 15/161,636

(22) Filed: May 23, 2016

(65) Prior Publication Data

US 2017/0295093 A1    Oct. 12, 2017

Related U.S. Application Data

(60) Provisional application No. 62/320,186, filed on Apr. 8, 2016.

(51) Int. Cl.
*H04L 12/715* (2013.01)
*H04H 20/26* (2008.01)
(Continued)

(52) U.S. Cl.
CPC ............ *H04L 45/64* (2013.01); *H04H 20/26* (2013.01); *H04L 12/4641* (2013.01);
(Continued)

(58) Field of Classification Search
CPC ... H04L 12/4633; H04L 12/185; H04L 45/64; H04L 63/101; H04L 12/1886;
(Continued)

(56) References Cited

U.S. PATENT DOCUMENTS

2016/0142220 A1* 5/2016 Hao ........................ H04L 12/18
370/390
2016/0359729 A1* 12/2016 Banavalikar ............ H04L 45/16

OTHER PUBLICATIONS

European Search Report dated Aug. 9, 2017, received from the European Patent Office in European Application No. EP17165723.
(Continued)

*Primary Examiner* — Jae Y Lee
*Assistant Examiner* — Aixa A Guadalupe Cruz
(74) *Attorney, Agent, or Firm* — Meunier Carlin & Curfman LLC (57) ABSTRACT

Presented herein are hybrid approaches to multi-destination traffic forwarding in overlay networks that can be used to facilitate interoperability between head-end-replication-support network devices (i.e., those that only use head-end-replication) and multicast-support network devices (i.e., those that only use native multicast). By generally using existing tunnel end-points (TEPs) supported functionality for sending multi-destination traffic and enhancing the TEPs to receive multi-destination traffic with the encapsulation scheme they do not natively support, the presented methods and systems minimize the required enhancements to achieve interoperability and circumvents any hard limitations that the end-point hardware may have. The present methods and systems may be used with legacy hardware that are commissioned or deployed as well as new hardware that are configured with legacy protocols.

19 Claims, 6 Drawing Sheets

(51) Int. Cl.
 *H04L 12/46*  (2006.01)
 *H04L 12/753*  (2013.01)
 *H04L 12/741*  (2013.01)
 *H04L 12/761*  (2013.01)
 *H04L 12/18*  (2006.01)

(52) U.S. Cl.
 CPC .............. *H04L 45/16* (2013.01); *H04L 45/48* (2013.01); *H04L 45/745* (2013.01); *H04L 12/1836* (2013.01)

(58) Field of Classification Search
 CPC ..... H04L 45/586; H04L 45/741; H04L 49/70; H04L 67/1095
 See application file for complete search history.

(56) References Cited

OTHER PUBLICATIONS

Xia Weiguo et al., "Detecting NVO3 Overlay Point-To-Multipoint Data Plane Failures; DRAFT-XIA-NV03-OVERLAY-P2MP-PING-01.TXT", Internet Engineering Task Force; Internet Society 4, Rue Des Falaises CH-1205 Geneva, Switzerland, Nov. 24, 2014, pp. 1-16.

A. Ghanwani Dell et al., "Framework of Supporting Applications Specific Multicast in NV03; DRAFT-GHANWANI-NV03-APP-MCAST-FRAMEWORK-02.TXT", Internet Engineering Task Force; Internet Society 4, Rue Des Falaises CH-1205 Geneva, Switzerland, Jan. 23, 2015, pp. 1-15.

D. Black EMC et al., "An Architecture for Overlay Networks (NV03); DRAFT-IETF-NVO3-ARCH-04.TXT", Internet Engineering Task Force; Internet Society 4, Rue Des Falaises CH-1205 Geneva, Switzerland, Oct. 20, 2015, pp. 1-33.

\* cited by examiner

| BIT OFFSET | BITS 0-7 | BITS 8-15 | BITS 16-31 |
|---|---|---|---|
| 0 | TYPE | MAX RESP TIME | CHECKSUM |
| 32 | GROUP ADDRESS | | |

| BIT OFFSET | BITS 0-3 | BIT 4 | BITS 5-7 | BITS 8-15 | BITS 16-31 |
|---|---|---|---|---|---|
| 0 | TYPE = 0X11 | | | MAX RESP TIME | CHECKSUM |
| 32 | GROUP ADDRESS | | | | |
| 64 | RESV | S | QRV | QQIC | NUMBERS OF SOURCES (N) |
| 96 | SOURCE ADDRESS [1] | | | | |
| 128 | SOURCE ADDRESS [2] | | | | |
| 128 | ... | | | | |
| 64+32N | SOURCE ADDRESS [N] | | | | |

ASYMMETRIC MULTI-DESTINATION TRAFFIC REPLICATION IN OVERLAY NETWORKS

RELATED APPLICATION

This application claims priority to, and the benefit of, U.S. Provisional Application No. 62/320,186, filed Apr. 8, 2016, titled "ASYMMETRIC MULTI-DESTINATION TRAFFIC REPLICATION IN OVERLAY NETWORKS," the application is incorporated by reference herein in its entirety.

TECHNICAL FIELD

The present disclosure relates to networking of tunnel end-point devices in overlay networks.

BACKGROUND

An overlay network is built on top of an underlying network (i.e., the underlay network) infrastructure to enhance the functionality of the underlay. Among other things, overlay networks may be used to support multi-tenancy as well as improve speed, flexibility, scalability, and manageability of application deployments, and, for example, to extend the reach of Layer 2 domains across data center pods, domains, and sites. VXLAN (Virtual Extensible LAN), for example, is a Layer 2 overlay scheme that is overlaid over a Layer 3 network. VXLAN uses VXLAN tunnel endpoint (VTEP) devices to map tenants' end devices to VXLAN segments and to perform VXLAN encapsulation and de-encapsulation.

One class of devices (referred to as a "multicast tunnel end-point" devices or "MC TEPS") can participate in IP multicast routing in the underlay and can map client- and overlay-multicast groups in the underlay. Multicast-protocol-support facilitates a more efficient delivery of traffic for one-to-many communications in allowing traffic to be sent to a set of network devices that have joined the multicast group.

A second class of devices (referred to as "Head End Replication") only supports head-end replication of the multi-destination traffic in which client- and overlay-multi-destination traffic are replicated, by the head-end replication device, and sent as separate unicast copies to each remote tunnel end-point device having listeners for the multicast channel. Head end replication is an encapsulation and de-capsulation scheme (rather than a tunnel type) that uses static mappings of VTEPs for the management of broadcast, unicast, multicast, and unknown packets.

In certain circumstances, it is desired to have multicast only supported (MC TEP) devices and head end replication only supported (HER TEP) devices interoperate with each other.

DESCRIPTION OF EXAMPLE EMBODIMENTS

Overview

Presented herein are hybrid approaches to multi-destination traffic forwarding in overlay networks that can be used to facilitate interoperability between head-end-replication-support network devices (i.e., those that only use head-end-replication) and multicast-support network devices (i.e., those that only use native multicast). By generally using existing tunnel end-points (TEPs) supported functionality for sending multi-destination traffic and enhancing the TEPs to receive multi-destination traffic with the encapsulation scheme they do not natively support, the presented methods and systems minimize the required enhancements to achieve interoperability and circumvents any hard limitations that the end-point hardware may have. The present methods and systems may be used with legacy hardware that are commissioned or deployed as well as new hardware that are configured with legacy protocols.

The present methods and systems facilitate interoperability even in scenarios where a common method for handling multi-destination traffic is not possible due to limitations/restrictions in the hardware capabilities of the end-points. The TEPs themselves could be virtual (software VTEPs) or physical (hardware VTEPs).

Example Embodiments

The presented methods and systems facilitate tunnel end-points with disparate multi-destination forwarding capabilities to interoperate in a network. Overlay systems are designed assuming that all ingress tunnel router (ITR), egress tunnel router (ETR) (collectively also referred to as "XTRs"), and tunnel end-points (TEPs) have matching capabilities. To this end, in such systems, all XTRs/TEPs either use head-end replication (HER) or use underlay multicast (MC). But, a bi-directional hybrid environment is not defined nor supported.

That is, in current overlay multicast solutions, a HER-capable XTR/TEP does not expect to receive multicast encapsulated traffic, nor does it participate in the underlay signaling required to join an underlay multicast distribution tree. Head End Replication TEPs (HER-TEPs) only provide support for client/overlay multi-destination traffic by replicating the traffic and sending a separate unicast copy of the multi destination traffic to each remote TEP with listeners for the multicast channel.

In addition, MC-capable XTR/TEPs (hereinafter to as MC-TEPs) do not expect to receive multicast traffic encapsulated in unicast, nor do the MC-capable XTR/TEPs participate in the signaling required to enable remote HER-TEPs to build the required replication lists. MC-TEPs can participate in the IP multicast routing in the underlay and map client/overlay multi-destination traffic to multicast groups in the underlay.

An Ingress Tunnel Router (ITR) may be a LISP (location/identifier separation protocol) Site edge device that receives packets from site-facing interfaces (internal hosts) and encapsulates them to remote LISP sites, or natively forwards them to non-LISP sites. An Egress Tunnel Router (ETR) may be a LISP Site edge device that receives packets from core-facing interfaces (the Internet) and decapsulates LISP packets and delivers them to local EIDs at the site. Customer Edge (CE) devices that implement ITR and ETR functions at the same time is often referred to as an XTR.

The exemplified methods and systems modify the control plane and data plane reception behavior of the MC-XTR/TEPs and HER-XTR/TEPs to define specific directional behavior at the respective XTR/TEPs type such that MC-XTR/TEPs can interoperate in a mixed environment with other HER-XTR/TEPs (and natively with other MC-XTR/TEPs), and HER-XTR/TEPs can interoperate in a mixed environment with MC-XTR/TEPs (and natively with other HER-XTR/TEPs.

The proposed mechanism enables a hybrid overlay environment by augmenting the behavior of XTRs/TEPs that use known overlay multi-destination traffic handling methods. The method does this by defining specific directional behavior at the XTRs/TEPs. This sense of directionality is not defined in the LISP multicast mechanism (or in other similar multicast mechanisms such as those used in OTV or VXLAN-EVPN).

This consideration of directionality in the exemplified methods and systems to complement and/or augment the behaviors of current overlay XTRs and TEPs facilitate operation of a hybrid overlay environment using the existing hardware of each respective XTR/TEPs and associated underlay network infrastructure and without the need for additional hardware or modification to the native controls of the underlay network infrastructure.

Because a TEP not capable of encapsulating in multicast (e.g., a HER-TEP) may be able to receive multicast encapsulated traffic, the present methods and systems leverage and use that feature of the HER-TEPs. The limitation is on the sending/encapsulating direction. Similarly, because a TEP not capable of doing headend replication (e.g., a MC-TEP) may be able to receive unicast encapsulated traffic, the present methods and systems leverage and use that feature of the MC-TEP.

Examples of overlay solutions that may use the exemplified methods and systems include, but are not limited to, LISP (location/identifier separation protocol) as currently defined, OTV (overlay transport virtualization), and Virtual Extension LAN (VXLAN).

An example of the multicast (MC)-TEPs include the Nexus 5600 Series Router, which supports only multicast-based BUM (broadcast, unknown destination address) handling due to hardware limitations. The Nexus 5600 Series Router is manufactured by Cisco Systems Inc. (San Jose, Calif.).

An example of the head end replication (HER)-TEPs include the Nexus 9K and the Virtual Topology System (VTS) and Virtual Topology Forwarder (VTF), which supports only ingress replication. The Nexus 9K and VTS/VTF are manufactured by Cisco Systems Inc. (San Jose, Calif.).

Figure 1:
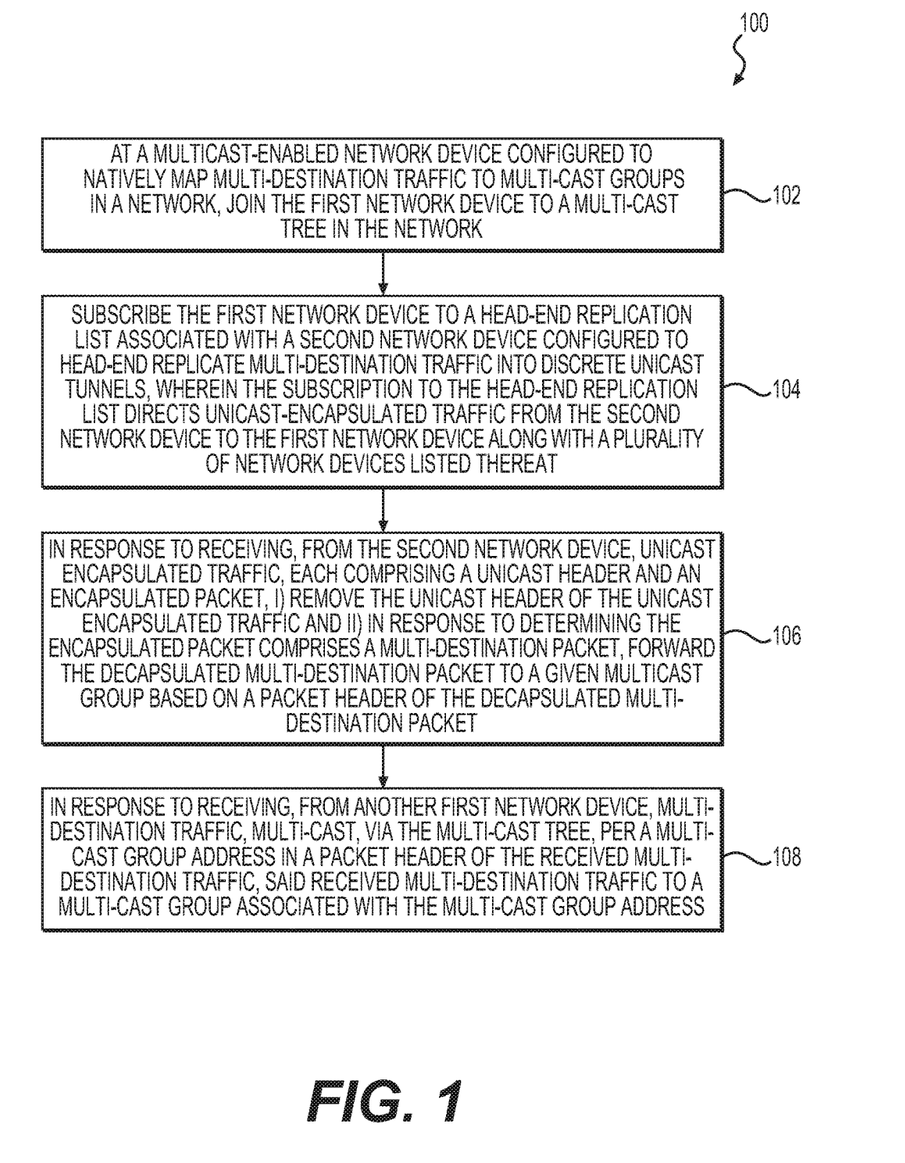
FIG. 1 is a flow chart of a method of operating a multicast tunnel end-point network device to facilitate multi-destination traffic operability with a head end replication tunnel end-point network device, in accordance with an illustrative embodiment.

FIG. 1 is a flow chart of a method 100 of operating a multi-cast tunnel end-point network device to facilitate multi-destination traffic operability with a head end replication tunnel end-point network device, in accordance with an illustrative embodiment.

The method 100 includes at the first network device (e.g., a multicast-enabled network device) configured to natively map multi-destination traffic to multicast groups in a network, joining (step 102) the first network device to one or more multi-cast trees each associated a multi-cast group in the network and subscribing (step 104) to a head-end replication list associated with a second network device configured to head-end replicate multi-destination traffic into discrete unicast tunnels. The subscription to the head-end replication list directs unicast-encapsulated traffic from the second network device to the first network device along with a plurality of network devices listed thereat. Thereafter, in response to receiving, from the second network device, unicast encapsulated traffic, each comprising a unicast header and an encapsulated packet, the method further includes removing (step 106) the unicast header of the unicast encapsulated traffic, and in response to determining the encapsulated packet comprises a multi-destination packet, forwarding the decapsulated multi-destination packet to a given multicast group based on a packet header of the decapsulated multi-destination packet. Also, thereafter, in response to receiving, from another first network device, multi-destination traffic, the method further includes multicasting (step 108), via the multi-cast tree, per a multi-cast group address in a packet header of the received multi-destination traffic, said received multi-destination traffic to a multi-cast group associated with the multi-cast group address. In some embodiments, the multi-cast group associated with the multicast group address includes one or more first network devices. In other embodiments, the multi-cast group associated with the multicast group address includes the one or more first network devices and one or more second network devices.

Put another way, multicast (MC)-capable end point can take multi-destination traffic and map that multi-destination traffic to a multi-destination tree in the network (i.e., an underlay network, i.e., a substrate that provide connectivity among routers in the network). An overlay (i.e., a virtual network) runs on top of the underlay that operate, effectively, on the edges of the network only, such that any traffic that is going to be transported in that overlay network is mapped to tunnels in the underlay with packet encapsulated with additional header that is understood in the underlay. Tunnel, in unicast, is a tunnel that gets directed to specific IP address by encapsulating a unicast IP header. In contrast, multicast-capable tunnel end points use a multi-cast tree for a multi-destination traffic. For the latter, multi-destination traffic is encapsulated with a multicast address destination to one or more multi-cast capable tunnel end point in which the multicast destination address is understood in the underlay. Example of multicast destination address includes a destination address range between 239.0.0.0 and 239.255.255.255. In some embodiments, the multicast destination address has a range between 224.0.0.0 and 239.255.255.255.

It is understood that throughout this specification the identifiers "first", "second", "third", "fourth", and such, are used solely to aid in distinguishing the various components and steps of the disclosed subject matter. The identifiers "first", "second", "third", "fourth", and such, are not intended to imply any particular order, sequence, amount, preference, or importance to the components or steps modified by these terms.

Figure 2:
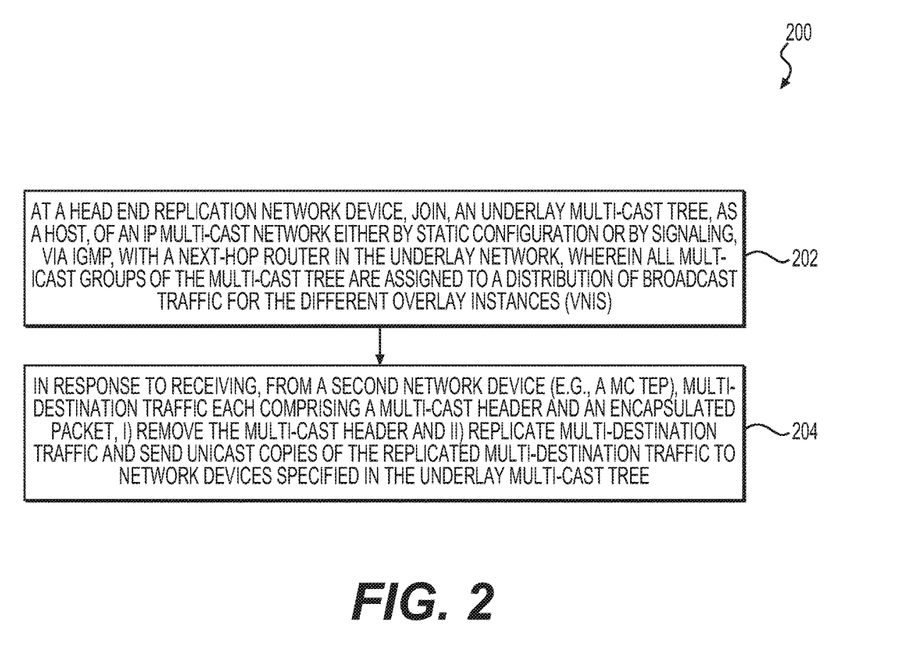
FIG. 2 is a flow chart of a method of operating a head end replication tunnel end-point network device to facilitate multi-destination traffic operability with a multi-cast tunnel end-point network device, in accordance with an illustrative embodiment.

FIG. 2 is a flow chart of a method of operating a head end replication tunnel end-point network device to facilitate multi-destination traffic operability with a multi-cast tunnel end-point network device, in accordance with an illustrative embodiment.

The method includes, at a first network device configured to replicate multi-destination traffic and to send separate unicast copy of the replicated multi-destination traffic to other network devices and is configured to not natively map multi-destination traffic to multi-cast groups in a network, joining (at step 202), an underlay multi-cast tree, in the network, as a host (and not as a router), of an IP multi-cast network either by static configuration or by signaling, via IGMP, with a next-hop router in the underlay network, wherein all multicast groups of the multi-cast tree are assigned to a distribution of broadcast traffic for the different overlay instances (VNIs).

Wherein thereafter, the method further includes, in response to receiving, from a second network device (e.g., a MC TEP), multi-destination traffic each comprising a multicast header and an encapsulated packet, removing (step 204) the multicast header and replicating the encapsulated packet of the multi-destination traffic and sending unicast copies of the replicated encapsulated packet to network devices specified in the underlay multi-cast tree.

Also thereinafter, the method includes, in response to receiving traffic from another first network device (e.g., a HER TEP), removing a header of the received traffic and sending unicast copies of the replicated and decapsulated traffic to a network device specified in the removed header (i.e., its local receivers).

System Diagrams

Figure 3:
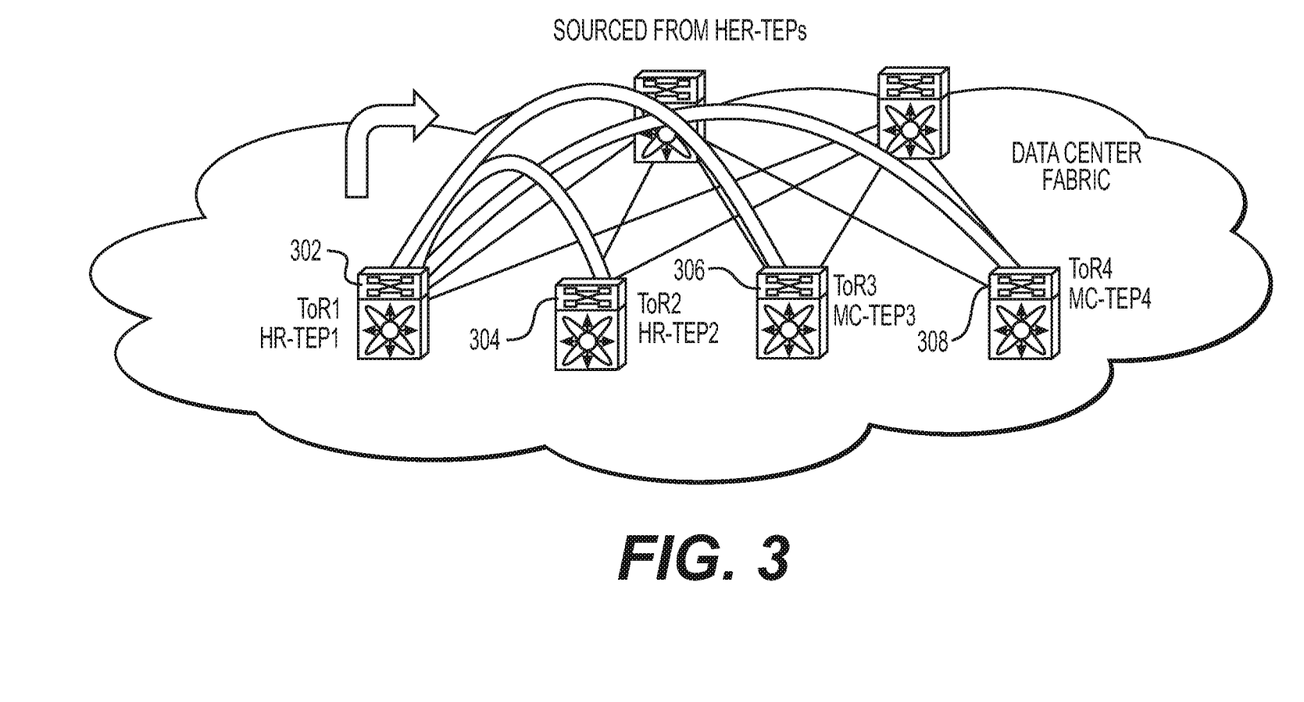
FIG. 3 is a diagram illustrating a system of multi-cast tunnel end-point network devices and head end replication network devices in which multi-destination traffic is directed from the head end replication network devices to multi-cast tunnel end-point network devices, in accordance with an illustrative embodiment.

As shown in FIG. 3, there are four tunnels endpoints, labeled a TOR1 302 ("Top of Rack 1" 302), TOR2 304 ("Top of Rack 2" 304), TOR3 306 ("Top of Rack 3" 306), and TOR4 308 ("Top of Rack 4" 308). Each of TOR1 302, TOR2 304, TOR3 306, and TOR4 308 may be a switch or router that directly connects to servers, e.g., in a datacenter. In some embodiments, the servers are arranged in racks, with the top of the rack including the switch that switch feeds into the network fabric of the datacenter.

TOR3 306 and TOR4 308 are Multicast Capable TEPs (MC-TEPs). They can participate in the IP multicast routing in the underlay, and they map client/overlay multi-destination traffic to multicast groups in the underlay.

TOR1 302 and TOR2 304 are configured as Head End Replication TEPs (HER-TEPs). They do not participate in the underlay IP multicast routing and only provide support for client/overlay multi-destination traffic by replicating the traffic and sending a separate unicast copy of the multi destination traffic to each remote TEP with listeners for the multicast channel.

Current HER-TEPs are often hard limited (e.g., in their ASICs) in their ability to support multicast. Conversely many ASICs (application specific integrated circuits) of MC-TEPs have limitations in their ability to support HER.

As shown in FIG. 3, TOR1 302 and TOR2 304 are head-end replication capable but are not multi-cast capable. In addition, TOR3 306 and TOR4 308 are multi-cast capable but are not head-end replication capable.

Referring still to FIG. 3, multi-cast in the direction of a HER device to a plurality of MC-devices is now described. Assume there is a source connected to TOR1 302 (or TOR2 304), i.e., the HER device; the encapsulating behavior of TOR1 302 is to create a separate copy of a multi-destination traffic. Take an example of multi-destination traffic such as a stock quote feed between TOR1 302 or TOR2 304, the feed would be unicasted, e.g., from TOR1 302, with a copy being sent to each of the TOR, e.g., to TOR2 304, as well as TOR3 306 and TOR4 308. To do so, for TOR2 304 (i.e., a HER-TEP), the control plane of TOR1 302 would subscribe TOR 2 to its replication list. Because TOR3 306 and TOR4 308 are multicast enabled only devices, they do not communicate with the control plane of TOR1 302 or TOR2 304. For TOR3 306 and TOR4 308 (i.e., the MC-TEPs) to receive the multi-destination traffic from TOR1 302 (i.e., the originating HER TEP), the present methods and systems enhance the control plane of TOR3 306 and TOR4 308, e.g., via an update to its firmware and/or software or, e.g., via an upgrade to its firmware and/or software, to cause the control plane of TOR3 306 and TOR4 308 to subscribe to the head end replication list of TOR1 302 (or TOR2 304). That is, with an upgrade or update to its firmware and/or software, the MC-TEP can receive unicast encapsulated multi-destination traffic, and the MC-TEPs can generate the overlay signaling necessary for HER-TEPs to populate a replication list with the MC-TEP listed therein.

To this end, TOR1 302 receives requests from each of the TOR2, TOR3, and TOR4 at places where it is listening to the stream to generate a replication list (i.e., a full list) that includes TOR2 304, TOR3 306, and TOR4 308. Then, in response to receiving a multi-destination traffic, TOR1 302 creates copies (in this example, 3 copies), each copies being encapsulated as it is being created in a unicast IP tunnel to the different TORs. At TOR3 306 and TOR4 308, their firmware and/or software are updated or modified to receive the unicast encapsulated traffic, to decapsulate the received unicast encapsulated traffic, and when the payload is determined to be a multi-destination traffic, then to do a replication (e.g., multi-cast replication) at a local site. For example, each of TOR3 306 or TOR4 308, may have, e.g., 48 ports, and listeners on, e.g., 40 of those ports. TOR3 306 and TOR4 308 may put a copy at each of the, e.g., 40 ports of the multi-destination traffic that is received. Thus, even though the original traffic from TOR1 302 or TOR2 304 was unicast encapsulated, the payload is multi-casted.

Figure 4:
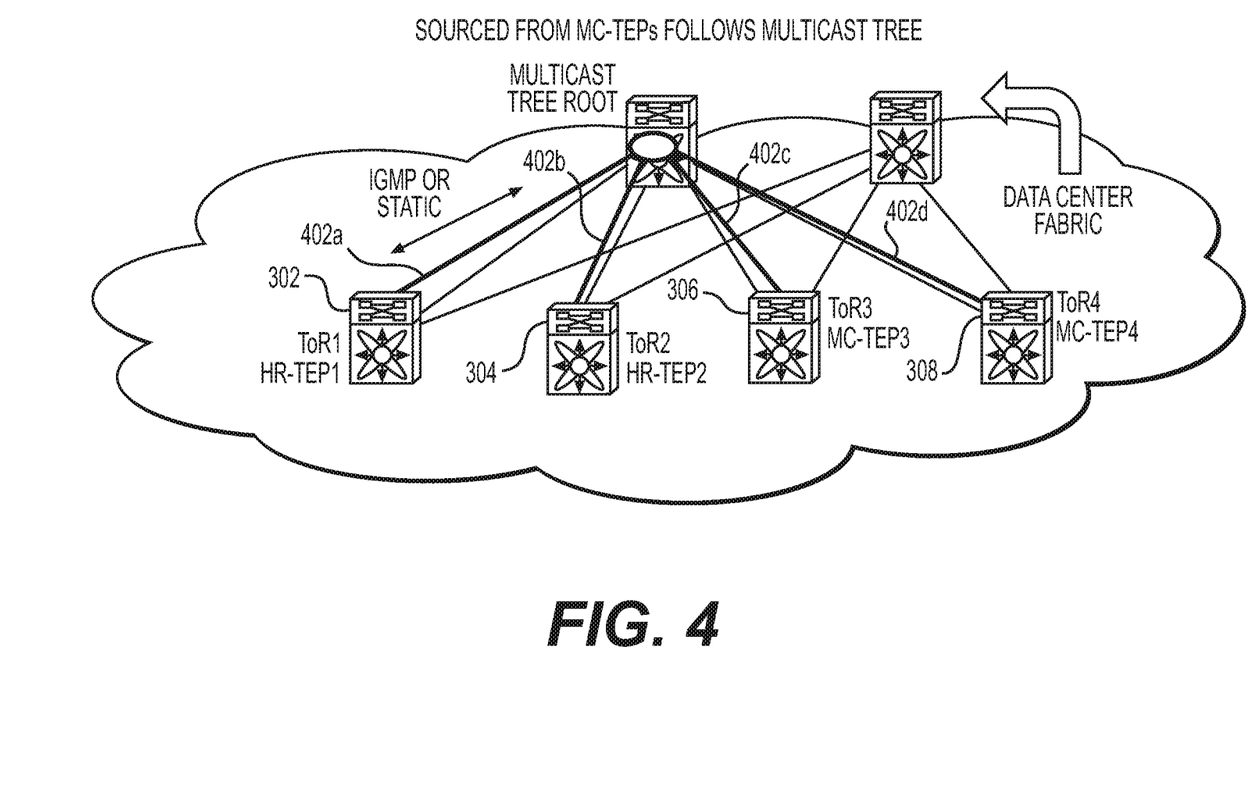
FIG. 4 is a diagram illustrating a system of multi-cast tunnel end-point network devices and head end replication network devices in which multi-destination traffic is directed from a multi-cast tunnel end-point network device to the head end replication network devices, in accordance with an illustrative embodiment.

FIG. 4 is a diagram illustrating a system of multi-cast tunnel end-point network devices and head end replication network devices in which multi-destination traffic is directed from a multi-cast tunnel end-point network device to the head end replication network devices, in accordance with an illustrative embodiment. FIG. 4 illustrates multi-destination traffic flow in the reverse direction of FIG. 3.

Using the stock quote feed example from FIG. 3, assume now the stock quote feed is originating from TOR4 308. Assume also that that there are listeners in TOR1 302, TOR2 304, and TOR3 306. As a MC-TEP, TOR3 306 simply joins a multicast tree as it would normally do. At TOR1 302 and TOR2 304, their firmware and/or software are updated or modified, to join the multicast tree. In some embodiments, the TOR1 302 and TOR2 304 join the multicast tree via a static join or an IGMP report.

The end result is that each of TOR1 302, TOR2 304, TOR3 306, and TOR4 308 joins the multicast tree and when a MC-TEP (e.g., TOR3 306 or TOR4 308) needs to send multi-destination traffic, the MC-TEP would encapsulate the traffic with a MC destination address (shown as line 402a-402d). TOR 4 encapsulates in multicast and that follows the tree shown in the screen. At TOR1 302 and TOR2 304 (i.e., the HER-TEPs), the firmware and/or software is updated or upgraded to allow reception of the multicast encapsulated traffic. Because the hardware (e.g., ASIC) of HER-TEPs is capable of decapsulating multicast encapsulated traffic, the modification at the HER-TEPs may include the removal or disabling of checks for multi-destination address.

Figure 7:
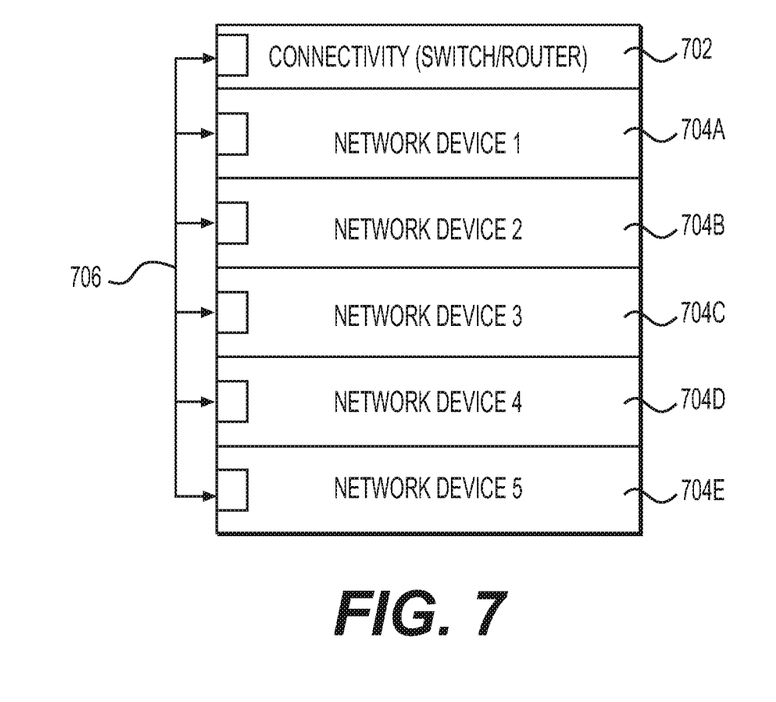
FIG. 7 is a diagram illustrating a TOR ("top of rack") network device.

Multicast tree in the underlay may be implemented in several different ways, e.g., a shared tree or a source tree. A source tree has its root at the source, and branches forms a spanning tree through the network to the receivers. The source tree is also referred to as a shortest path tree. A shared tree uses a single common root placed at some chosen point in the network. An example TOR 700 is shown in FIG. 7. The TOR 700 includes a connectivity device (e.g., a router or switch 702) and a plurality of network devices 704 (shown as devices 704*a*, 704*b*, 704*c*, 704*d*, and 704*e*). The connectivity devices 702 are connected to each network devices 704 via, e.g., twisted-pair wires or fiber optic cable 706.

Modification to Existing Multicast (MC) Capable TEP

The standard operation of MC capable TEP is to receive multi-cast traffic for the overlay, and to map that traffic to an underlay multicast group by encapsulating the traffic in a multi-cast destination address. To this end, MC capable TEP, in some embodiments, includes integrated circuit (e.g., an ASIC, mixed-signal FPGA, or other programmable mixed-signal integrated circuit) configured to natively map multi-destination traffic to multi-cast groups in an underlay network. On the receiving side, MC capable TEP are functional from a unicast perspective.

When interoperating with HER devices, and are receiving multi-destination stream from HER devices, the MC TEP can be modified to receive a unicast encapsulated packet. To do so, the MC TEP is further configured to receive unicast encapsulated packet, and to respond to the payload if the payload is determined to be a multicast or a broadcast traffic by replicating the decapsulated multi-destination address to the local site. To this end, even though the MC-TEP receives a unicast encapsulated packet, the MC-TEP can treat the received traffic as a multi-destination traffic after decapsulation.

To configure MC-TEP to receive the unicast encapsulated traffic, as a first change, in some embodiments, checks on the source destination addresses or the destination address that are implemented in the software of the MC-TEPs are lifted or removed. In addition, as a second change, the MC-TEPs are configured in the signaling of its control plane of the MC-TEPs to include requests to join a replication list. MC-TEPs are configured, in their normal mode, to join a multicast-tree in the underlay, and the signaling that is issued and that is expected to be received is aligned with that scheme.

In some embodiments, upon receiving an IGMP (Internet Group Management Protocol) REPORT or a PIM (Protocol Independent Multicast) JOIN, the MC-TEPs are configured, as a third change, to map multi-destination addresses therein to the relevant replication list in the overlay. In addition, in some embodiments, the MC-TEPs is configured to signal, as a fourth change, using border gateway protocol (BGP), a controller and signal interest to the control plane of the HER-XTR/TEP to be added as a member of the distribution list so that the HER-XTR/TEP can unicast traffic to it. These enhancements enable the capability to have a TEP either send traffic head-end replicated and receive it multi-cast encapsulated OR vice versa, and multi-cast encapsulated and receive head-end replicated. MC-XTR/TEPs and HER-XTR/TEPs that have these features would be interoperable.

Put another way, to configure MC-TEP to receive the unicast encapsulated traffic, the IP underlay is assumed to be multicast enabled, and MC-TEPs are fully functional in this IP underlay network (i.e., can participate in the unicast and multicast control planes in the underlay network and are capable of sending and receiving both multicast encapsulated traffic as well as unicast encapsulated traffic). The MC-TEPs are enhanced by:

1) MC-TEPs are configured to be able to receive multi-destination traffic that has been unicast encapsulated. The MC-TEPs are configured to de-capsulate such traffic and properly handle/replicate the multi-destination payload (e.g., whether it is an Ethernet Broadcast, IP Multicast or other).

2) MC-TEPs are configured to be to issue the overlay signaling necessary for HER-TEPs with multi-destination sources to create a head-end unicast replication list. In some embodiments, this involves mainly having the MC-TEPs report their interest in receiving multi-destination traffic to any HER-TEPs with sources for such multi-destination traffic.

Modification to Existing Head End Replication (HER) Capable TEPs

Existing HER-TEPs typically unicast encapsulate locally replicated multi-destination traffic and can receive multicast encapsulated multi-destination traffic. That is, HER TEPs send the traffic head end replicated and accept traffic that may be encapsulated with a multi-destination address. To this end, existing HER-TEPs may include integrated circuit (e.g., an ASIC, mixed-signal FPGA, or other programmable mixed-signal integrated circuit) configured to replicate the multi-destination traffic and to send the separate unicast copies of the replicated multi-destination traffic to other network devices and is configured to not natively map multi-destination traffic to multi-cast groups in an underlay network. This same ASIC may not be able to encapsulate in multi-cast or participate in multi-cast tree in the core. For MC-TEP to receive unicast encapsulated multi-destination traffic from a HER-TEP, the software (e.g., firmware) of the HER-TEP are enhanced by:

1) HER-TEPs are configured to be able to receive multi-destination traffic that has been multicast encapsulated. The HER-TEPs are configured to de-capsulate such traffic and execute any local replications required to distribute the multi-destination traffic received. In some embodiments, the unicast pipeline (of the ASIC) can decapsulate the header and, using the software of the HER-TEPs, look at inner header and cause execution any local replication required, via the ASIC.

2) HER-TEPs are configured to be connected to the IP Multicast network as hosts, rather than routers, to minimize the multicast requirements on the HER-TEPs. Thus, HER-TEPs are configured to join, as a host, an underlay multicast tree either by static configuration or by signaling such as IGMP with the next hop router in the underlay. The HER-TEPs are configured to join all multicast groups assigned to the distribution of broadcast traffic for the different overlay instances (VNIs) instantiated on the TEP. The joining of the HER-TEPs as a host facilitates a thin multicast implementation on the control plane of the HER-TEPs.

The signaling to join such group takes place, in some embodiments, the moment an overlay instance is provisioned and activated on the TEP. In some embodiments, joining the underlay multicast group is using well understood IGMP reporting mechanisms. In another embodiment, the group could be joined by having a network controller program static entries on the next hop router as overlay instances are provisioned/activated.

Example of Multicast Tunnel End-Point Apparatuses that is Interoperable with Head End Replication Tunnel End-Point Apparatuses According to another aspect, an apparatus is disclosed (e.g., a MC TEP configured to interoperate with a second network device (e.g., HER-TEP) configured to head-end replicate multi-destination traffic into discrete unicast tunnels). The apparatus includes a processor; a memory having instructions stored thereon; and an integrated circuit configured to natively map multi-destination traffic to multi-cast groups in a network, joining a multi-cast tree in the network. The instructions, when executed by the processor, cause the processor to subscribe to a head-end replication list associated with a second network device (e.g., a HER-TEP) configured to head-end replicate multi-destination traffic into discrete unicast tunnels, wherein the subscription to the head-end replication list directs unicast-encapsulated traffic from the second network device to a plurality of network devices listed thereat; wherein thereafter, i) in response to receiving, from the second network device (e.g., the HER-TEP), unicast encapsulated traffic, each comprising a unicast header and an encapsulated packet, remove, via the integrated circuit, the unicast header of the unicast encapsulated traffic, and ii) in response to determining the encapsulated packet comprises a multi-destination packet, forward, via the processor, the decapsulated multi-destination packet to a given multicast group based on a packet header of the decapsulated multi-destination; and wherein thereafter, in response to receiving, from a network device, multi-destination traffic, multi-cast, via the integrated circuit using data from a multi-cast tree, per a multicast group address in a packet header of the multi-destination traffic, said received multi-destination traffic to a multi-cast group associated with the multicast group address, wherein the multi-cast group includes one or more network devices (e.g., MC-TEPs). In some embodiments, the multi-cast group further includes one or more second network devices (e.g., HER-TEPs).

In some embodiments, the integrated circuit of the network device (e.g., MC-TEP) is selected from the group consisting of an application-specific integrated circuit (ASIC), a mixed-signal FPGA, and a programmable mixed-signal integrated circuit. In some embodiments, the processor, memory, and integrated circuit, collectively, form a router. In some embodiments, the apparatus includes one or more ports, wherein at least one port of the one or more ports is shared between a first virtualized network device and a second virtualized network device each instantiated with the apparatus.

Example of Head End Replication Tunnel End-Point Apparatuses that is Interoperable with Multicast Tunnel End-Point Apparatuses According to another aspect, an apparatus is disclosed (e.g., a HER TEP configured to head-end replicate multi-destination traffic into discrete unicast tunnels to facilitate multi-destination traffic operation with a second network device (e.g., MC-TEP)). The apparatus includes a processor; a memory having instructions stored thereon; and an integrated circuit configured to natively map multi-destination traffic to multi-cast groups in a network. The instructions, when executed by the processor, cause the processor to join a multi-cast tree in the underlay network; and to subscribe to a head-end replication list associated with a network device (e.g., HER-TEP) configured to head-end replicate multi-destination traffic into discrete unicast tunnels, wherein the subscription to the head-end replication list directs unicast-encapsulated traffic from the subscribed device to a plurality of network devices listed thereat; wherein thereafter, i) in response to receiving, from a network device (e.g., MC-TEP), multi-destination traffic each comprising a multicast header and an encapsulated packet, remove, via the integrated circuit, the multicast header and replicate, via the integrated circuit, the encapsulated packet of the multi-destination traffic and send, via the integrated circuit, unicast copies of the replicated encapsulated packet to network devices specified in the underlay multi-cast tree.

In some embodiments, the integrated circuit of the network device (e.g., HER-TEP) is selected from the group consisting of an application-specific integrated circuit (ASIC), a mixed-signal FPGA, and a programmable mixed-signal integrated circuit.

In some embodiments, the processor, memory, and integrated circuit, collectively, form a router. In some embodiments, the apparatus includes one or more ports, wherein at least one port of the one or more ports is shared between a first virtualized network device and a second virtualized network device each instantiated with the apparatus.

The present methods and systems may be used when a mix of ASICs in a data center has been implemented or will be implemented.

Example IGMP Report

Figure 5:
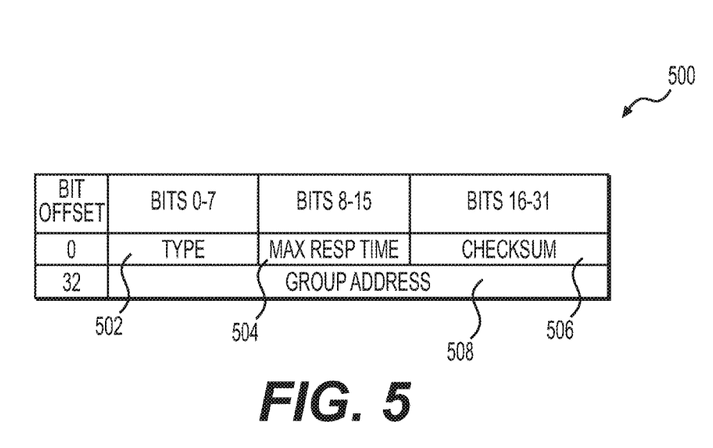
FIG. 5 is a diagram illustrating an example IGMPv2 request to join a head end replication network device to an underlay multi-cast tree.

FIG. 5 is a diagram illustrating an example IGMPv2 request 500 to join a head end replication network device to an underlay multi-cast tree. As shown in FIG. 5, the request 500 includes a type field 502, a maximum response time field 504, a checksum field 506, and a group address field 508. The type field 402 indicates a message type (e.g., a Membership Query (0x11), a Membership Report (IGMPv1: 0x12, IGMPv2: 0x16, IGMPv3: 0x22), a Leave Group (0x17)). The maximum response time field 504 specifies a time limit for the corresponding report in response to a Membership Query (0x11). The group address field 508 specifies a multicast address being queried when sending a Group-Specific or Group-and-Source-Specific Query. The checksum field 506 is a 16-bit one's complement of the one's complement sum of the entire IGMP message.

Figure 6:
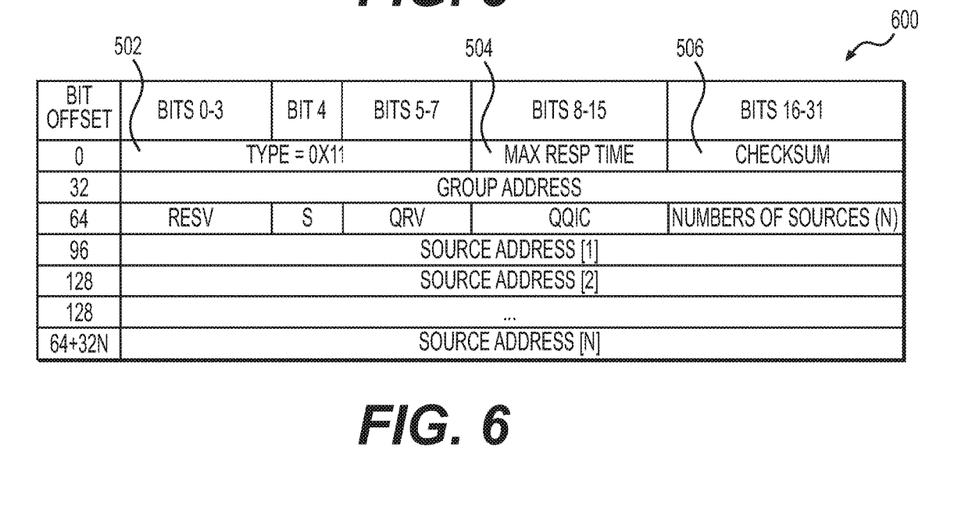
FIG. 6 is a diagram illustrating an example IGMPv3 request to join a head end replication network device to an underlay multi-cast tree.

FIG. 6 is a diagram illustrating an example IGMPv3 request 600 to join a head end replication network device to an underlay multi-cast tree. As shown in FIG. 6, the request 600 includes the type field 502, the maximum response time field 504, the checksum field 506, and the group address field 508. In addition, the request 600 includes reserved fields 602, a S-flag 604 (shown as "S 604"), a Querier Robustness Variable field 606 (shown as "QRV 606"), a Querier's Query Interval Code field 608 (shown as "QQIC 608"), and number of source field 610 (shown as "Number of Sources (N) 610"), and a plurality of source address 612 (shown as 612a, 612b, 612c, and 614d). The reserved field 602 includes reserve bits. The S-flag 604 (i.e., suppress router-side processing flag) indicates to receiving routers that they are to suppress the normal timer updates. The Querier's Robustness Variable field (QRV) 606 contains the Robustness Variable value used by the sender of the Query. The Querier's Query Interval Code field 608 specifies the Query Interval value (in seconds) used by the querier. The Number of Sources (N) field 610 specifies the number of source addresses present in the Query. For General and Group-Specific Queries, this value is zero. For Group-and-Source-Specific Queries, this value is non-zero, but limited by the network's MTU. The Source Address [i] fields 612 are a vector of N IP unicast addresses, where N is the value in the Number of Sources (N) field.

What is claimed is:

1. A system configured to natively map multi-destination traffic to multi-cast groups in a network, the system comprising:
    a processor; and
    a memory having instructions stored thereon to natively map multi-destination traffic received from, and transmitted to, head-end-replication supported network devices and multicast-supported network devices, wherein the instructions, when executed by the processor, cause the processor to:
    join the system to one or more multi-cast trees each associated with a multi-cast group in the network;
    subscribe to a head-end replication list for head-end replicating multi-destination traffic into discrete unicast tunnels, wherein the subscription to the head-end replication list directs unicast-encapsulated traffic to a plurality of network devices listed in the head-end replication list;
    in response to receiving unicast encapsulated data traffic from a device having transmitted a unicast encapsulated data traffic based on a head-end replication list that includes the system, wherein each received unicast encapsulated data traffic comprises a unicast header and an encapsulated packet, remove the unicast header of the unicast encapsulated data traffic, and in response to determining the encapsulated packet comprises a multi-destination packet, multi-cast the decapsulated multi-destination data packet to a given multicast group based on a packet header of the decapsulated multi-destination data packet; and
    in response to receiving multi-destination data traffic, multi-cast, via a multi-cast tree, per a multicast group address in a packet header of the multi-destination data traffic, said received multi-destination data traffic to a multi-cast group associated with the multicast group address.

2. The system of claim 1, comprising a first integrated circuit configured to natively map multi-destination data traffic to the multi-cast groups in the underlay network.

3. The system of claim 1, wherein the network device that transmitted the unicast encapsulated data traffic comprises a integrated circuit configured to replicate multi-destination data traffic as a separate unicast copy of the replicated multi-destination data traffic, and wherein the network device is configured to not natively map multi-destination data traffic to multi-cast groups in an underlay network.

4. The system of claim 1, wherein the system comprises a router.

5. The system of claim 4, wherein the system comprises a visualized router.

6. The system of claim 1, wherein the network device that transmitted the unicast encapsulated data traffic comprises a router.

7. The method of claim 6, wherein the network device that transmitted the unicast encapsulated data traffic is a virtualized router that shares at least one port with another virtualized router.

8. The system of claim 1, wherein the system comprises a multi-cast enabled tunnel end-point device.

9. The system of claim 1, wherein the network device that transmitted the unicast encapsulated data traffic comprises a head-end replication-enabled tunnel end-point device.

10. A system configured to natively unicast locally replicated multi-destination traffic, the system comprising:
    a processor; and
    a memory having instructions stored thereon, wherein the instructions, when executed by the processor, cause the processor to replicate multi-destination data traffic as separate unicast copies of the replicated multi-destination data traffic and is configured to natively map multi-destination data traffic to multi-cast groups in an underlay network by:
    joining, an underlay multi-cast tree in an IP multi-cast network as a host, either by static configuration or by signaling via IGMP, with the system in the underlay network, wherein all multicast groups of the multi-cast tree are assigned to a distribution of broadcast traffic for a different overlay instances (VNIs);
    in response to receiving, from a network device having transmitted a multi-cast multi-destination data traffic that includes the system, wherein the multi-destination data traffic comprises a multicast header and an encapsulated packet, i) removing the multicast header and ii) replicating the encapsulated packet as unicast copies of the replicated encapsulated packet to network devices specified in the underlay multi-cast tree associated with the multicast header.

11. The system of claim 10, wherein the system comprises a head-end replication-enabled tunnel end-point device.

12. The system of claim 10, wherein the network device comprises a multi-cast enabled tunnel end-point device.

13. The system of claim 10, comprising an integrated circuit configured to replicate the multi-destination data traffic and to send the separate unicast copies of the replicated multi-destination data traffic to other network devices, wherein the integrated circuit is configured to not natively map multi-destination data traffic to multi-cast groups in an underlay network.

14. The system of claim 13, wherein the network device that transmitted the multi-destination data traffic comprises a router.

15. The system of claim 14, wherein the network device that transmitted the multi-destination data traffic is a virtualized router that shares at least one port with anther virtualized router.

16. The system of claim 10, wherein the network device that transmitted the multi-destination data traffic comprises an integrated circuit configured to natively map multi-destination traffic to multi-cast groups in an underlay network.

17. The system of claim 10, wherein the system comprises a router.

18. The system of claim 17, wherein the system comprises a visualized router.

19. A method, comprising:
    at a first network device configured to natively map multi-destination data traffic to multi-cast groups in a network, joining the first network device to a multi-cast tree associated with a multicast group in the network;
    subscribing the first network device to a head-end replication list for head-end replicating multi-destination data traffic into discrete unicast tunnels, wherein the subscription to the head-end replication list directs unicast-encapsulated data traffic to a plurality of network devices listed in the head-end replication list;
    in response to receiving, from a network device having transmitted a unicast encapsulated data traffic based on a head-end replication list that includes the first network device, wherein each unicast encapsulated data traffic comprises a unicast header and an encapsulated packet, removing, at the first network device, the unicast header of the unicast encapsulated data traffic, and in response to determining the encapsulated packet comprises a multi-destination packet, multicasting, by the first network device, the decapsulated multi-destination packet to a multicast group of network devices based on a packet header of the decapsulated multi-destination packet; and in response to receiving, at the first network device, multi-destination data traffic, multi-casting, via the multi-cast tree, per a multicast group address in a packet header of the multi-destination data traffic, said received multi-destination data traffic to a multi-cast group associated with the multicast group address; and at a second network device configured to replicate multi-destination data traffic and to send separate unicast copy of the replicated multi-destination data traffic to other network devices and is configured to not natively map multi-destination data traffic to multi-cast groups in an underlay network, joining, the multi-cast tree, as a host, either by static configuration or by signaling, via IGMP, with a next-hop router in the underlay, wherein all multicast groups of the multi-cast tree are assigned to a distribution of broadcast traffic for the different overlay instances (VNIs); and in response to receiving, at the second network device, from a third network device having transmitted a multi-destination data traffic that comprises a multicast header and an encapsulated packet, i) removing the multicast header and ii) replicating the encapsulated packet of the multi-destination data traffic and sending unicast copies of the replicated encapsulated packet to network devices specified in the underlay multi-cast tree.

* * * * *